United States Patent
Fields et al.

(10) Patent No.: US 8,428,344 B2
(45) Date of Patent: Apr. 23, 2013

(54) SYSTEM AND METHOD FOR PROVIDING MOBILE RANGE SENSING

(75) Inventors: John Richard Fields, Princeton, NJ (US); James Russell Bergen, Princeton, NJ (US); Garbis Salgian, Princeton, NJ (US)

(73) Assignee: SRI International, Menlo Park, CA (US)

( * ) Notice: Subject to any disclaimer, the term of this patent is extended or adjusted under 35 U.S.C. 154(b) by 21 days.

(21) Appl. No.: 13/242,533

(22) Filed: Sep. 23, 2011

(65) Prior Publication Data

US 2012/0082340 A1    Apr. 5, 2012

Related U.S. Application Data

(63) Continuation of application No. 11/860,650, filed on Sep. 25, 2007, now Pat. No. 8,059, 887.

(60) Provisional application No. 60/847,000, filed on Sep. 25, 2006.

(51) Int. Cl.
*G06K 9/00* (2006.01)

(52) U.S. Cl.
USPC ........... 382/154; 382/294; 382/209; 382/112; 382/141

(58) Field of Classification Search ............. 382/112, 382/141, 144, 145, 243
See application file for complete search history.

(56) References Cited

U.S. PATENT DOCUMENTS

| | | | | |
|---|---|---|---|---|
| 5,768,443 A * | 6/1998 | Michael et al. | ............... | 382/294 |
| 6,359,695 B1 * | 3/2002 | Takahashi et al. | ............. | 358/1.1 |
| 7,389,002 B1 * | 6/2008 | Knight | .......................... | 382/294 |
| 7,561,188 B2 * | 7/2009 | Kondo et al. | ............... | 348/222.1 |
| 2002/0001094 A1 * | 1/2002 | Yoshida et al. | ................ | 358/1.9 |
| 2003/0179398 A1 * | 9/2003 | Takano et al. | ................... | 358/1.9 |
| 2003/0210329 A1 * | 11/2003 | Aagaard et al. | ............... | 348/159 |
| 2004/0247174 A1 * | 12/2004 | Lyons et al. | .................. | 382/154 |
| 2005/0174586 A1 * | 8/2005 | Yoshida et al. | ................ | 358/1.9 |
| 2005/0279172 A1 * | 12/2005 | Schreier et al. | ................. | 73/657 |
| 2008/0065350 A1 * | 3/2008 | de Groot et al. | ............. | 702/166 |
| 2009/0079813 A1 * | 3/2009 | Hildreth | ..................... | 348/14.03 |

* cited by examiner

*Primary Examiner* — Vu Le
*Assistant Examiner* — Aklilu Woldemariam
(74) *Attorney, Agent, or Firm* — Moser Taboada

(57) ABSTRACT

The present invention provides an improved method for estimating range of objects in images from various distances comprising receiving a set of images of the scene having multiple objects from at least one camera in motion. Due to the motion of the camera, each of the images are obtained at different camera locations. Then an object visible in multiple images is selected. Data related to approximate camera positions and orientations and the images of the visible object are used to estimate the location of the object relative to a reference coordinate system. Based on the computed data, a projected location of the visible object is computed and the orientation angle of the camera for each image is refined. Additionally, pairs of cameras with various locations can obtain dense stereo for regions of the image at various ranges.

13 Claims, 5 Drawing Sheets

Ray bundle intersection. Top-down view, in camera coordinates: X to the right, Y down (pixels), Z away from camera (m)

Slope as a function of position

Ray bundle corresponding to trend line in Figure 4B.

1

SYSTEM AND METHOD FOR PROVIDING MOBILE RANGE SENSING

CROSS-REFERENCE TO RELATED APPLICATIONS

This application is a continuation of co-pending U.S. patent application Ser. No. 11/860,650, filed Sep. 25, 2007, and U.S. provisional patent application Ser. No. 60/847,000, filed Sep. 25, 2006. The aforementioned related patent applications are herein incorporated by reference in their entirety.

GOVERNMENT RIGHTS IN THIS INVENTION

This invention was made with U.S. government support under contract number DAAD19-01-2-0012. The U.S. government has certain rights in this invention.

FIELD OF THE INVENTION

The invention relates generally to a visual means for a mobile sensing system for refining camera poses used to acquire multiple views of a scene. More specifically, the invention relates to an improved system and method for estimating range including objects in the images from various distances.

BACKGROUND OF THE INVENTION

A persistent issue in the sensing system is the need to determine the structure of a scene, including objects seen at long distances using a mobile platform. Scene structure recovered in the range of 50 m-1000 m is useful for planning for autonomous mobility and mapping unobserved areas. Sensing from 100 m-2000 m is useful for reconnaissance, surveillance, and target acquisition (RSTA), target designation, and cueing automatic target recognition (ATR). The difficulty with using images from a moving platform is knowing the precise relationship (position and direction) between the cameras that acquired the images. In particular, the relative pointing angles between the cameras must be known to a milliradian or better.

A conventional approach is to use a laser range finder or LADAR, but these ranges require high power, and LADAR is emissive. So, the scene structure typically recovered from LADAR sensing has power/speed/resolution limitations at the ranges of interest (hundreds of meters to a kilometer or more).

Vision stereo with a fixed baseline can also be used to acquire range information. Accurate range estimates for objects that are a kilometer away, however, requires a 10 m baseline, which is impractical for a mobile, fixed-baseline system. Passive depth recovery at mid-ranges requires longer baselines than can be achieved by a practical fixed-baseline stereo system. So, scene structure recovered from conventional stereo vision systems have a fixed baseline that limits range and/or mobility of the stereo system.

Thus, a need exists in the art for an improved sensing system for estimating range and detecting the objects from large distances.

SUMMARY OF THE INVENTION

The present invention provides a method for detecting range of at least one object of a scene. The method comprises receiving a set of images of the scene having multiple objects from at least one camera in motion. The images are obtained at different locations of the camera. The method also comprise selecting images having at least one of the object and computing data related to estimation of a position and orientation of the camera and position and orientation of the selected images. The method further comprise determining a projected location of the object based on the computed data and adjusting the estimated orientation of the camera for each of the selected images based on the projected location of the object.

Furthermore, there is provided a computer program product comprising computer readable storage medium having a computer program stored thereon for performing the method described above.

DETAILED DESCRIPTION OF THE INVENTION

Figure 1:
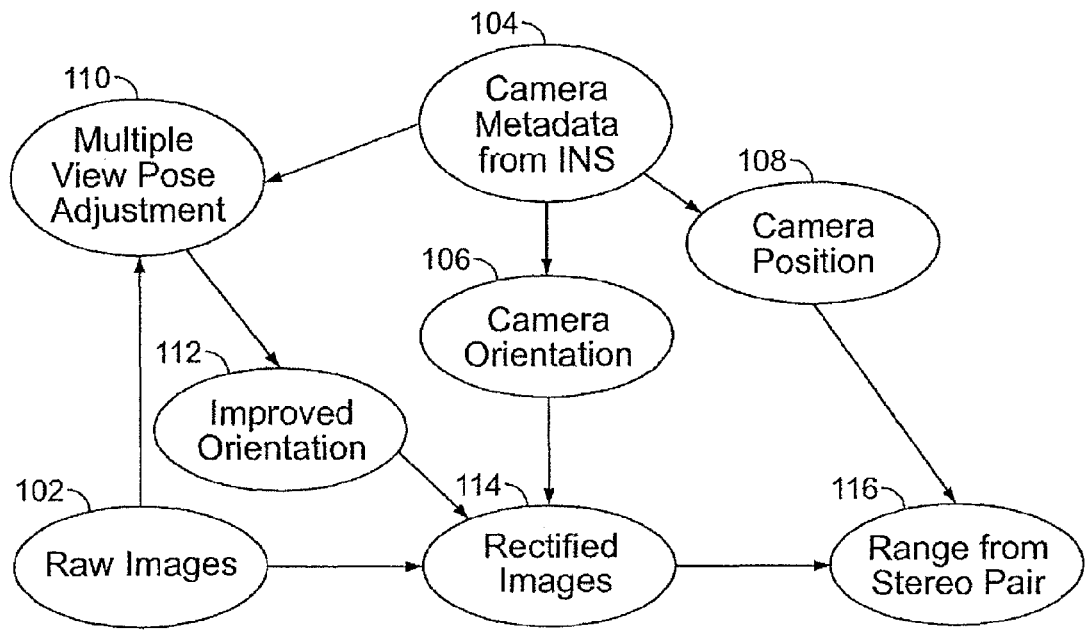
FIG. 1 illustrates a flow diagram of the procedure of the visual means of the sensing system in accordance with an embodiment of the present invention.

The basic scenario in the present invention is that images of essentially the same scene are captured from multiple viewpoints. The images are captured preferably due to one camera mounted on a moving platform or alternatively due to multiple cameras mounted on the moving platform that are moving through the scene. So, if the relative camera positions are known, the present invention proposes to rectify the images (correct them for differing camera orientations) prior to computing the stereo disparity (through image-matching techniques) to determine the range to objects in the scene. Referring to FIG. 1, there is shown a flow diagram of the procedure of visual means of the sensing system in accordance with an embodiment of the present invention. A series of raw images are captured at step 102 from the camera (not shown) mounted on a moving platform. Note that these images are captured at different camera locations or at different camera separations relative to the first camera image. Simultaneously, the camera metadata 104 is obtained from the inertial navigation system (INS) also installed on the moving platform. Preferably, the camera orientation 106 and the camera position 108 are derived from the metadata 104. The steps described above are known to one skilled in the art.

The current invention assumes that the positions of the cameras are known well enough but that individual orientation measurements are not accurate enough to permit range estimation at distances of interest. So, in order to correct the error in individual camera orientations, a multiple view pose adjustment of the raw images are performed at step 110 using the measurements of the camera metadata 102. Then, using the multiple view pose adjustment 110 and the camera orientation 106, an improved orientation of the camera is obtained at step 112. Upon obtaining the adjusted improved orientation 112, the images can be rectified at step 114, which is followed by the standard stereo analysis of image pairs to obtain dense range maps at step 116. Image rectification 114 and standard stereo pair analysis 116 are procedural steps well known in the art.

Figure 2:
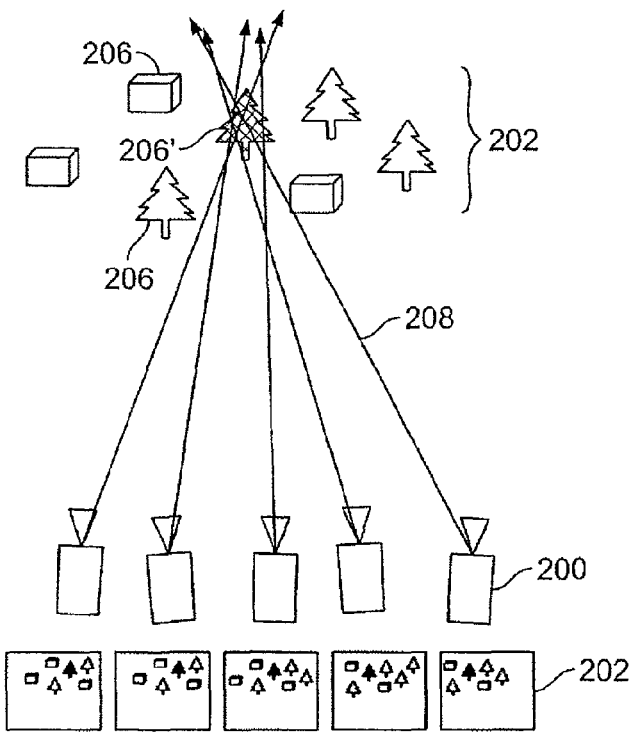
FIG. 2 shows an illustration of the exemplary sensing system in accordance with the present invention.
Figure 3A:
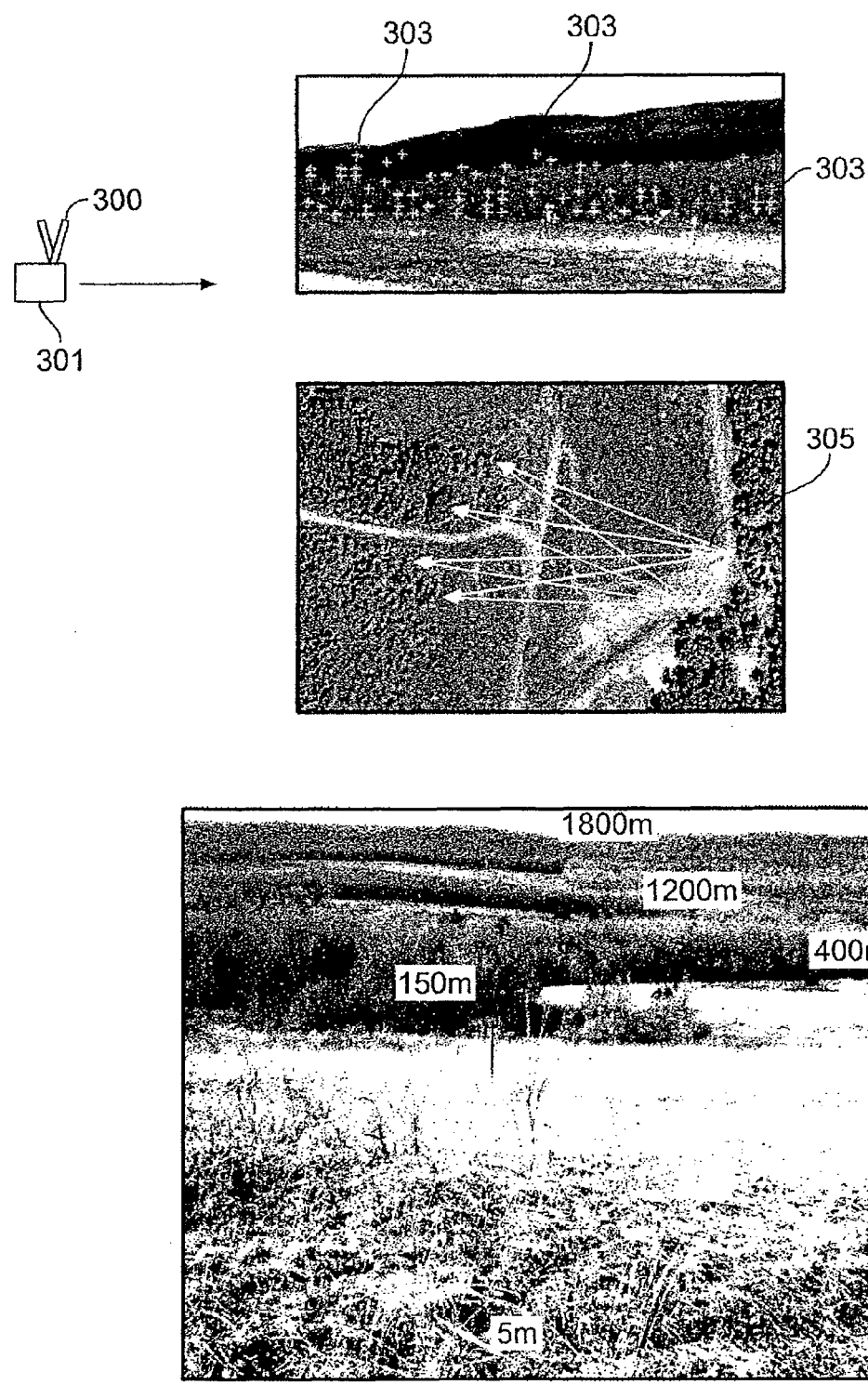
FIG. 3A shows an exemplary imagery illustrating the processing steps of the in accordance with another embodiment of the present invention.
Figure 3B:
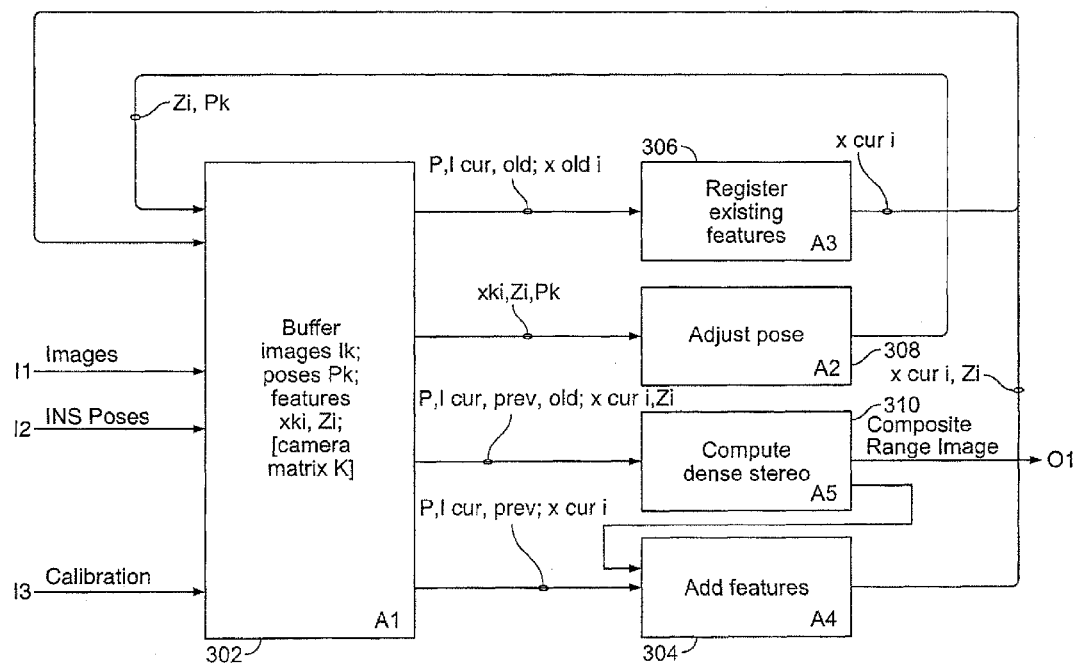
FIG. 3B illustrates a block diagram of the architecture of the algorithm of the sensing system in accordance with an embodiment of the present invention.

The procedural steps of multiple view pose adjustment 110 and improved orientation 112 will be described in greater detail herein with respect to FIGS. 2, 3A and 3B. The procedural steps depends on tracking multiple objects in multiple images. FIG. 2 illustrates an exemplary sensing system for the procedural steps. FIG. 3A and 3B illustrates an exemplary imagery and the corresponding block diagram of the architecture of the algorithm to execute the major processes of multiple view pose adjustment 110 and the improved orientation 112.

In FIG. 2, there is shown multiple cameras 200 on a moving platform (not shown), each of the cameras 200 capturing images 202 of a scene 204 having multiple features or objects 206. These images 202 are captured at different locations of the cameras 200. In this application, a "feature" or an "object" is any small region corresponding to a single distance in the world, and having sufficient texture to be tracked. Note that the range of the images 202 obtained are both for a distant background as well as a foreground and the range can vary from about 5 m to about 2000 m. Consider one object, for example a tree 206' in FIG. 3 that is visible in multiple images 202. In each image 202, the location of the tree 206' in the image and the estimation of the camera position and orientation define a ray 208 in space. A bundle of rays 208 defines the likely location of the tree 206' in three dimensions (left-right, up-down, and range) relative to a reference coordinate system (e.g. the one defined by the first camera). This step of the bundle analysis is preferably repeated for multiple objects in the scene 204.

Referring back to FIG. 2, now, consider one camera 200 on a moving platform, and the objects 206 that it are in its field-of-view. Using the 3D object locations determined earlier, one can compute the places where the objects 206 should be located in the image 202, based on the estimated camera orientation. Then, adjust the estimated orientation angles for the camera 200 in order to make the computed locations match the locations where the objects were actually observed. This step of orientation adjustment may preferably be repeated for multiple cameras. The procedure steps defined above may be iterated, but the iteration is not required.

The imagery including the general steps of FIG. 3A will be described simultaneously with the architecture of FIG. 3B. Referring now to FIG. 3A, there is shown a camera 300 preferably integrated with an INS, on a moving platform 301, to capture video and vehicle pose while moving to generate sufficient camera separation. The captured images, INS poses and camera calibration are buffered in a memory 302 as shown in FIG. 3B. Then, using stereo calculations with the initial camera poses (positions and orientations), identify and track objects or features 303 as shown in FIG. 3A, preferably at a distant region, that could be expected to be visible across many images. This process is identified as a Add features 304 in FIG. 3B. Any small image patch with enough texture to allow matching in a subsequent images was considered to be an "object" or "feature." As described above, the location of each object 303 in the image and the estimation of the camera position and orientation defines a ray 305 in space as shown in FIG. 3A. A bundle of these rays 305 define the likely or projected location of the objects 303 in three dimensions relative to a reference coordinate system.

Now referring back to FIG. 3B, the process of Register Existing Features 306 is computed in which when a new image arrives via the camera (typically after vehicle travel of 0.5 m), image registration techniques are used to obtain a gross alignment of the distant region of the previous image with the new image. The exact locations of tracked features are then determined by local registration of image patches surrounding the expected feature location. Even though it is not required, these processes are preferably iterated to obtain sufficient history of the features. If sufficient history is available, adjust the camera poses by adjusting the estimated orientation angles for the camera in order to make the computed locations match the locations where the objects were actually observed. This is computed by the Adjust Pose 308 process of FIG. 3 to minimize the global error measure. Then, using the resulting pose compute dense stereo for the current image at process 310.

Dense stereo for foreground objects is computed most effectively by comparing the current image with a nearby image, for which the effective baseline is short (for example, 1 m or less). Dense stereo for distant objects is computed most effectively by comparing images with a wider separation, for which the effective baseline is longer (for example, 10 m). In general, different baselines can be chosen to compute dense stereo for different regions of the image, according to the distance of features in that part of the image. Short-baseline stereo indicates where the disparity is small, requiring a longer baseline. Stereo in these areas can be computed with increasing separation between cameras, until the range to the most distant features is determined. The output is a composite range image having range estimates obtained for the distant background (1800 m) as well as the foreground (5 m) as shown in FIG. 3A.

This implementation involves a "boot-strap" element, known to one skilled in the art, in which un-corrected poses are used to identify regions of the image that are not close to the camera, to seed the feature selection. The output of the system improves as a history of tracked features accumulates, and pose adjustment becomes possible. Alternatively, one can use a conventional fixed-baseline stereo with a short baseline (on the order of 0.5 m) to obtain the range estimates needed to choose distant features.

Note as described above in FIG. 1, that for each stereo pair, the refined/adjusted poses (improved orientation 112) of the cameras are preferably used to rectify the images at step 114 prior to the stereo calculation at step 116. The image rectification involves making the raw images 102 appear as they would through this improved orientation of the camera.

Figure 4A:
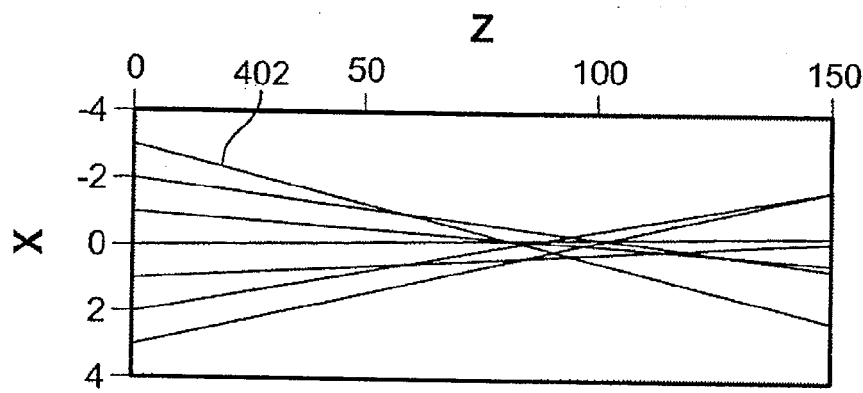
FIG. 4A shows a graphical representation of the ray bundles of the location of the features of the image.

The pose adjustment process 308 will now be described in greater details with respect to the graphical representation of the ray bundles in FIGS. 4A, 4B and 4C. Referring to FIG. 4A, a feature-track consists of x, y image location (image pixels from upper left corner) of the same object in the scene from one image to the next. Relative to the camera, the object is located at coordinates X,Y,Z where X is to the right, Y is down and Z is away from the camera (meters). As described above, when combined with the nominal camera poses, the image locations describe rays 402 in space that should intersect in a single point. In practice, the rays 402 form a bundle without a single intersection point, as illustrated schematically in FIG. 4A.

Figure 4B:
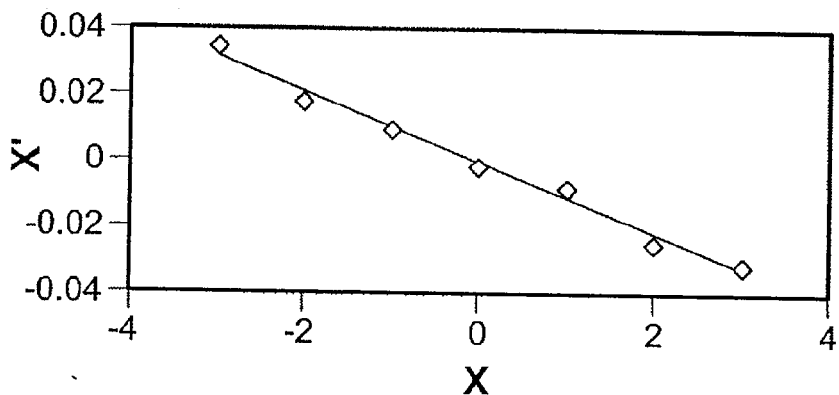
FIG. 4B shows a graphical representation of the slope of the ray bundles of FIG. 4A as a function of the position.
Figure 4C:
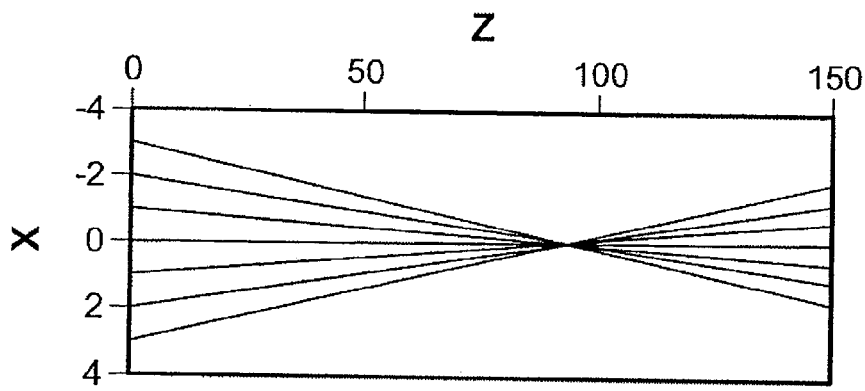
FIG. 4C shows a graphical representation of the ray bundles corresponding to the trend line of FIG. 4B.

To estimate a single intersection point, consider the slope of each ray 402 as a function of its initial X coordinate, as illustrated in FIG. 4B. A line that is fit to this data defines an approximation to the specified bundle, with the property that the approximation does have a single intersection point. A robust technique is used to identify outliers. The inliers are fit using standard techniques (such as least squares). FIG. 4C shows the ray bundle corresponding to the trend line. The range obtained from the bundle in the X-Z plane can then be used to compute a mean Y value for the intersection point. (Here X is to the right, Y is down, and Z is along the viewing direction.)

Figure 5:
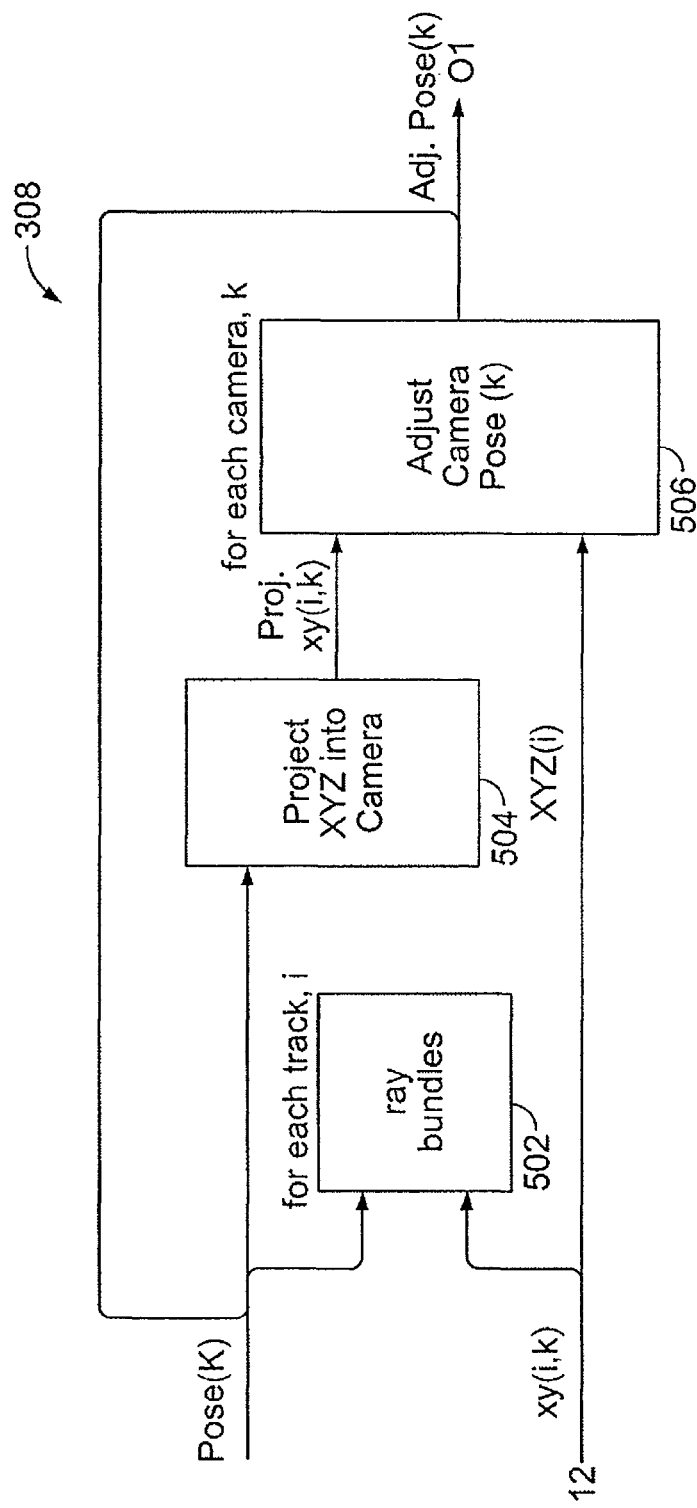
FIG. 5 illustrates a block diagram of the adjustment pose of the algorithm of the system in accordance with another embodiment of the present invention.

Referring to FIG. 5, there is shown a block diagram of the process summary of the adjustment pose 308. So, initially, the ray bundles 402 are analyzed at step 502 for each image xy(i,k), i stands for a feature and k is the camera pose. Step 502 includes analyzing the ray bundles 402 to estimate world points. Once a set of world points is obtained, X,YZ (i), the points can be projected into the images from the cameras. This is shown in step 504 where XYZ is projected into the camera and the output is the projected image, Proj. x,y (i,k). Each projection depends on the orientation of the respective camera, i.e. Pose (k). This mathematical projection, Proj. x,y (i,k) is used to adjust the orientation angle, pose k of the camera at step 506, thus outputting the Adj. Pose (k). The feed back loop shows that these process steps are iterated for each camera. The Adj. Pose (k) forces the camera to align in order to refine poses, thus, forcing the projected locations to match the locations of the tracked images having the objects or features. Note that the initial camera angles, i.e. Pose (k) are accurate to about 10 mR (0.6 degree), however, after the pose adjustment, the angles, i.e. Adj. Pose (k) are accurate to about 0.1 mR. Although, not shown, the yaw, pitch and roll of each camera is adjusted by the adjustment pose 308 to minimize the error between the locations of the projected points and the observed (tracked) locations.

Furthermore, for efficiency and fidelity the correction for lens distortion is performed as part of the stereo calculation. The projective transformation used to rectify images is combined with the lens distortion correction to obtain an overall flow field. This overall flow field is applied to the raw image to obtain a rectified image with just one warp. In principle, the pose adjustment needs an image corrected for lens distortion, but without any correction for camera orientation.

In the preferred embodiment of the present invention, the camera lens distortion correction and projective rectification are combined in a single image warping operation, to reduce processing time and image smoothing due to multiple warping operations. The problem is resolved by tracking features in the raw (distorted) image, but converting the image coordinates of each feature to those for an undistorted image when the feature track is stored. The pose adjustment is then carried out using an ideal camera model. A similar problem arises with the selection of distant features. Tracking is performed with raw (distorted) images, but the range information needed for selecting features is computed in undistorted, rectified images. Here the solution is to warp the range image from rectified to distorted coordinates.

Thus, the present invention provides a visual means to determine the range to distant objects by simultaneously locating points in the world and refining camera pointing angles. The techniques described above could be used with intermediate and long range observations to refine the camera poses (positions and orientations) to obtain a self-consistent set of range information. Note that the present invention is not limited to moving platforms on ground and may preferably include moving platforms on air needed to sense the environment.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A computer implemented method for detecting range of one or more objects in a scene comprising:
   detecting one or more objects from a set of images of the scene captured from one or more cameras;
   selecting images from the set of images containing the detected one or more objects;
   computing dense stereo for foreground objects and for background objects of a current image by:
   comparing the current image with a first image from the selected images having a long baseline for distant background objects to generate a first composite image having range estimates obtained for the background objects;
   comparing the current image with a second image from the selected images having a short baseline for foreground objects to generate a second composite image having range estimates obtained for the foreground objects; and
   associating the first composite image with the second composite image to form a composite range image with range estimates for the foreground and background objects,
   wherein baseline is measurement of a separation distance between the one or more cameras.

2. The method of claim 1 wherein the computing is performed after:
   determining a projected location of the detected one or more objects based on computed metadata comprising position and orientation for the one or more camera and for the selected images;
   adjusting the pose of the one or more cameras for each of the selected images based on the projected location of the detected one or more objects, and
   the computing of dense stereo is based on the adjusted pose of the one or more cameras.

3. The method of claim 2 wherein said step of adjusting matches the location of the one or more objects in the selected images with the projected location of the one or more objects.

4. The method of claim 2 further comprising buffering the computed metadata of the selected images for the one or more cameras in motion.

5. The method of claim 2 further comprising rectifying the selected images based on the adjusted estimated pose of the one or more cameras.

6. The method of claim 5 wherein the rectified images are displayed through the adjusted estimation orientation of the one or more cameras.

7. The method of claim 5 further comprising computing a dense stereo image of the rectified images.

8. A non-transitory computer readable medium comprising computer readable storage medium having a computer program stored thereon for performing the method of claim 1.

9. The method of claim 2 wherein the computing comprises calculating multiple rays from the one or more cameras to the one or more objects defining the projected location of the one or more objects.

10. The method of claim 1 wherein the one or more cameras is one camera in motion.

11. The method of claim 1 wherein the one or more cameras is a plurality of cameras, which are stationary or moving.

12. A non-transitory computer readable medium comprising computer readable storage medium having a computer program stored thereon for:
   detecting one or more objects from a set of images of the scene captured from one or more cameras;

selecting images from the set of images containing the detected one or more objects;

computing dense stereo for foreground objects and for background objects of a current image by:

comparing the current image with a first image from the selected images having a long baseline for distant background objects to generate a first composite image having range estimates obtained for the background objects;

comparing the current image with a second image from the selected images having a short baseline for foreground objects to generate a second composite image having range estimates obtained for the foreground objects; and associating the first composite image with the second composite image to form a composite range image with range estimates for the foreground and background objects, wherein baseline is measurement of a separation distance between the one or more cameras.

13. The method of claim 12 wherein the computing comprises calculating multiple rays from the camera to the one or more objects defining the projected location of the one or more objects.

\* \* \* \* \*